June 30, 1936.   G. A. THOMSON   2,045,622
SPECTACLES
Filed July 19, 1934

G. A. Thomson   Inventor
By  *signature*
Attorneys.

Patented June 30, 1936

2,045,622

UNITED STATES PATENT OFFICE 2,045,622

SPECTACLES

Gilbert A. Thomson, Coffeyville, Kans.

Application July 19, 1934, Serial No. 736,079

4 Claims. (Cl. 88—47)

This invention relates to spectacles. It has for an object the provision of a novel form of frame which can be clamped tightly about lenses even though there might be slight variations in the sizes of the lenses, there being means for concealing any gaps which may be left in the frame due to its application to lenses which are slightly oversize.

It is a further object of the invention to provide a novel connection between the spectacle frame and the bows, said connection being such as to permit quick, minute adjustment of the bows upwardly or downwardly relative to the frame so as to insure positioning the lenses at the angle best suited to the wearer.

Another object is to provide spectacles each lens of which is in one piece but made up of upper and lower sections of glass fused together, the upper section of each lens being colored while the lower section can be of the usual clear uncolored glass.

With the foregoing the other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1:
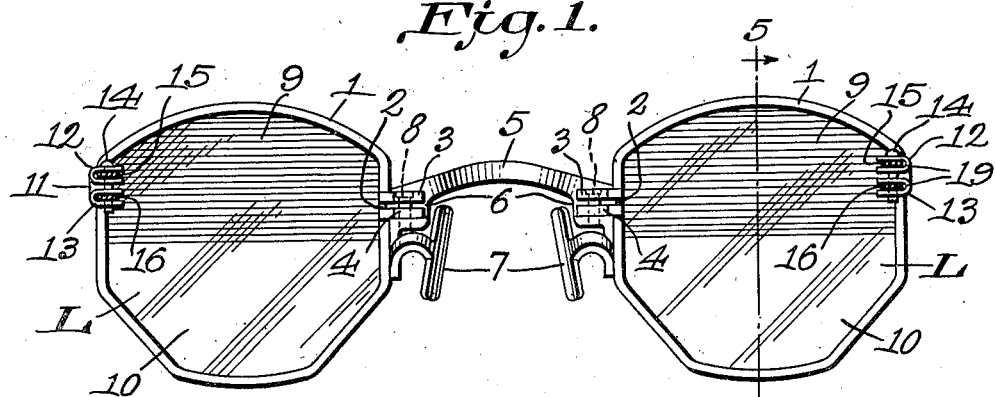
Figure 1 is a rear elevation of the spectacles embodying the present improvements, the forked ends of the bows being shown in section.

Referring to the figures by characters of reference, I designates the lens frames formed of any suitable material and of any desired configuration. Each of these frames is split at its inner side as shown at 2 and a lug 3 is extended laterally from the frame at its upper end while another lug 4 is extended from the frame at its lower end, the lugs of each frame being extended toward the opposed frame and being of course located at the split or break in the frame. Formed integral with the lower lug 4 of each frame is a bridge 5 and the ends of the bridge are enlarged to provide shields 6 which not only extend in front of the lugs 4 but also in front of and above the lugs 3. Nose pieces 7 are joined in any suitable manner to the respective frames below and adjacent to the bridge.

The two lugs on each frame are joined by a tightening screw 8. By turning this screw in one direction the lug 3 will be forced toward the lug 4 so that the frame I will thus be tightened about the lens L seated therein. Thus it will be apparent that each frame can be used in connection with lenses not only of correct sizes but also with lenses which are slightly oversize and any gaps which might be left between the lugs 3 and 4 will not be objectionable because they will not be visible when the spectacles are viewed from the front.

Each lens is preferably formed of an upper section 9 formed of colored glass and a lower section 10 formed of clear or uncolored glass. The two sections are fused together to form a one piece lens and are adapted to be subsequently ground to meet the requirements of the user. By forming a lens in two pieces fused together one of which is colored, it becomes unnecessary to use separate colored glasses in front of or in lieu of prescribed glasses. It has been found that where supplemental colored lenses are used or colored shields are provided, a deflection of the light rays occurs which is objectionable to persons required to use specially ground lenses. The present lenses will overcome these objections by providing ground lenses each in one piece but having a colored area and a clear or uncolored area.

A composite lens such as described has been found particularly advantageous for use by the drivers of vehicles because it is unnecessary to use separate sun-shields or colored lenses for excluding the blinding rays of the sun.

For the purpose of connecting the bows to the frames I a novel form of joint has been provided. This includes a clip-like member II fastened in any suitable manner to the outer side of each frame I and formed with upper and lower ears 12 and 13 respectively. Each of these ears is in the nature of a channel open at its inner side and at that end remote from the frame I. A pivot pin 14 is extended through both channelled ears and engages the upper and lower fingers 15 and 16 of the forked end of a bow 17. The upper finger 15 of each bow can be extended straight forwardly from the bow as shown while the lower finger 16 is preferably parallel with finger 15 but extended from a downwardly offset portion 18. The fork of the bow is formed of metal or other material which can be bent by the use of small pincers or the like.

Figure 4:
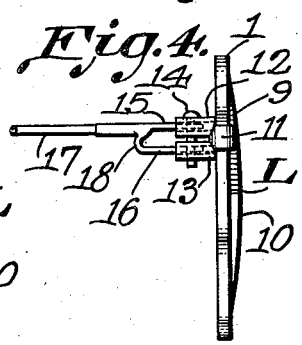
Figure 4 is a side elevation of the spectacles, the bows being broken away.
Figure 5:
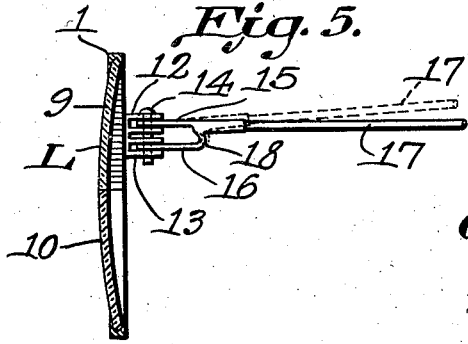
Figure 5 is a section on line 5—5, Figure 1, a portion of the bow being illustrated in two positions by full and dotted lines respectively.
Figure 6:
Figure 6 is a perspective view of the forked end of one of the bows.

When the fingers 15 and 16 are in their normal positions as in Figure 4 and as shown by full lines in Figure 5 the bow will be extended at right angles to the plane occupied by its frame 1. However by bending the offset 18 backwardly away from the frame 1 finger 16 will be slightly elongated so that the bow 17 will be brought to an upwardly inclined position as indicated by broken lines in Figure 5. By bending the offset 18 in the opposite direction the bow will be brought to a downwardly inclined position. Thus the angle of the frame 1 relative to the bows can be readily changed to meet the requirements and without the danger of breaking the lens as frequently happens when an attempt is made to bend the ordinary bow close to its pivotal point.

Figure 2:
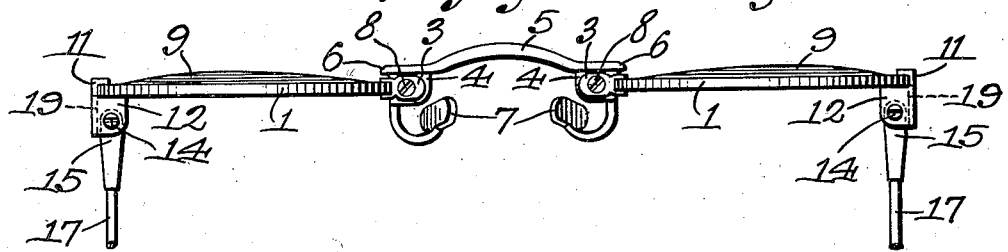
Figure 2 is a plan view of the spectacles, portions of the bows being broken away.
Figure 3:
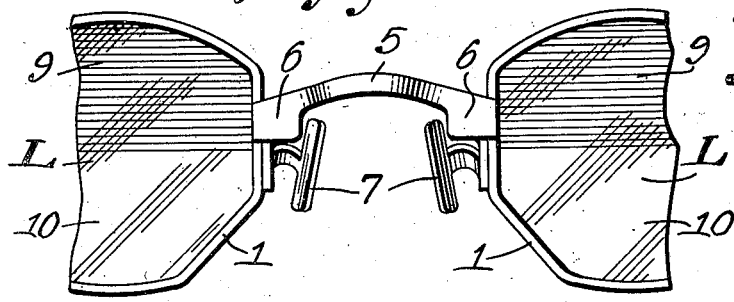
Figure 3 is a front elevation of the front portion of the spectacles.

By providing channelled ears 12 and 13 the intermediate portions 19 thereof will act as stops for limiting the movement of the bows away from each other. This will be apparent by referring to Figure 2.

While it is preferred to make the lenses by fusing the two sections of glass together it is to be understood that these sections can be joined with cement or in any other suitable manner.

What is claimed is:

1. Spectacles including lens frames split at their inner sides, a bridge connected to the frames below the split, said bridge including end shields, and means back of the shields and concealed thereby from the front for adjustably connecting the upper portions of the frames to the lower portions thereof at the splits.

2. Spectacles including lens frames split at their inner sides, a bridge having end shields joined to the respective frames below the splits and extending upwardly above the splits, lugs extending from each of the frames above and below the splits in back of the bridge, and means joining said lugs for adjustably connecting them, said shields constituting means for concealing the lugs and connecting means when viewed from the front.

3. Spectacles including lens frames split at their inner sides, upper and lower lugs extending from the respective ends of each frame at the split therein, means adjustably connecting said lugs to contract the frames, a bridge connected to each frame below the split area, and shields carried by the base for extending upwardly past the splits and lugs and the adjusting means.

4. Spectacles including lens frames split at their inner sides, nose pieces and a bridge joined to the frames below the splits, lugs extending from each frame above and below the splits therein, means connecting the lugs for adjustably connecting them to contract the frame without changing the relation between the nose pieces and the bridge, there being shields at the ends of the bridge extending in front of and adapted to conceal the lugs and adjusting means and the splits.

GILBERT A. THOMSON.